United States Patent [19]

Brückner et al.

[11] Patent Number: 5,152,048
[45] Date of Patent: Oct. 6, 1992

[54] PROCESS FOR MANUFACTURING A COMPOSITE ASSEMBLY OF CERAMIC AND STEEL

[75] Inventors: Raimund Brückner, Engenhahn; Hans Rothfuss, Taunusstein; Manfred Winkelmann, Krefeld; Ulrich Nebe, Hungen, all of Fed. Rep. of Germany

[73] Assignee: Didier-Werke AG, Wiesbaden, Fed. Rep. of Germany

[21] Appl. No.: 623,361

[22] Filed: Dec. 6, 1990

[30] Foreign Application Priority Data

Dec. 22, 1989 [DE] Fed. Rep. of Germany ....... 4021259

[51] Int. Cl.$^5$ ............................................. B23P 11/02
[52] U.S. Cl. ...................................... 29/447; 29/446; 29/458; 219/10.43
[58] Field of Search ................... 29/446, 447, 458; 219/10.43, 10.57

[56] References Cited

U.S. PATENT DOCUMENTS

| | | | |
|---|---|---|---|
| 1,894,835 | 1/1933 | Smith et al. | 29/447 |
| 2,499,456 | 3/1950 | Browne | 29/447 |
| 3,775,831 | 12/1973 | Cachet | 29/447 |
| 4,133,095 | 1/1979 | Lewis et al. | 29/458 |
| 4,258,939 | 3/1981 | Karlen | 285/381 |
| 4,336,432 | 6/1982 | Bajorek | 29/447 |
| 4,738,561 | 4/1988 | Röttger | 403/365 |
| 4,791,259 | 12/1988 | Pfaffmann | 29/447 |
| 4,849,594 | 7/1989 | Balger | 219/10.43 |

FOREIGN PATENT DOCUMENTS

3527793A1  2/1987  Fed. Rep. of Germany .
3538421A1  5/1987  Fed. Rep. of Germany .

Primary Examiner—P. W. Echols
Assistant Examiner—David P. Bryant
Attorney, Agent, or Firm—Wenderoth, Lind & Ponack

[57] ABSTRACT

A composite assembly includes a ceramic inner member and an outer shell member fit around the inner member. The outer shell member is heated and expanded, the two members then are mutually located at predetermined positions relative to each other, and the members are cooled such that the outer shell member shrinks onto the inner member. Heating of the outer shell member is achieved by an inductive heater to result in the predetermined temperature, after which the inner member is moved to the predetermined position thereof relative to the outer shell member, while the outer shell member is maintained at such predetermined temperature.

45 Claims, 2 Drawing Sheets 5,152,048

PROCESS FOR MANUFACTURING A COMPOSITE ASSEMBLY OF CERAMIC AND STEEL

BACKGROUND OF THE INVENTION

The present invention relates to a process for manufacturing a composite assembly of the type including a ceramic inner member and an outer shell member fit around the inner member, wherein the outer shell member is heated and expanded, the members are mutually located at predetermined positions relative to each other, and the members are cooled such that the outer shell member shrinks onto the inner member, thereby forming the composite assembly.

This type of process is described in German DE 35 27 793, involving the manufacture of a gas flushing or purging stone or brick. In this known arrangement, a steel sleeve is heated by means of a flame or in a heating furnace. When heating the steel sleeve by a flame, the heating of the sleeve is nonuniform with the result that some areas of the sleeve remain colder than other areas thereof. The result is that the steel sleeve expands unevenly. Such differential expansion is disadvantageous during subsequent shrinking of the steel sleeve onto the ceramic stone or brick. When the outer sleeve or shell and the inner ceramic stone or brick are joined together, a process that is itself difficult due to the high temperatures involved and the necessary low tolerances of the dimensions of the two members, the outer shell or sleeve cools faster at outer edges thereof. As a result, shrinkage is not uniform. The same basic problems occur when the outer shell or sleeve is heated in a heating furnace.

Additionally, the heated steel sleeve or shell normally is grasped by pliers or tongs or the like and is moved thereby to the inner ceramic brick or stone and is positioned thereover. Those areas of the heated steel sleeve or shell that are grasped by such pliers or tongs are cooled more rapidly than the other areas of the heated steel sleeve or shell. As a result, when the heated steel sleeve or shell finally is positioned on the inner ceramic brick or stone, the expansion of the sleeve or steel further will be nonuniform. A further disadvantage of this arrangement is that the use of pliers or tongs to grip the heated steel sleeve or shell can result in deformation thereof. A further disadvantage of this known process is that inevitably the heated steel sleeve or shell loses significant heat due to radiation before final positioning with respect to the inner ceramic stone or brick. This requires initial heating to a higher temperature, and this is not economical.

German DE 35 38 421 also discloses another known process for assembling a gas flushing or purging stone or brick. In this arrangement a layer of refractory paper-like material is inserted between the brick and the steel sleeve. Such paper-like material can be formed of ceramic fibers and is intended to prevent unwanted passage of gas that can remain during the process of shrinking the outer shell or sleeve onto the inner ceramic member.

SUMMARY OF THE INVENTION

With the above discussion in mind, it is an object of the present invention to provide a process of the above described type but whereby it is possible to overcome the above and other prior art disadvantages.

It is a further object of the present invention to provide such a process whereby it is possible to insure that the entire outer shell member is heated uniformly and whereby it is possible to insure that the ceramic inner member can be finally positioned within the outer shell member while such outer shell member still is in a uniformly heated condition.

The above and other objects are achieved in accordance with the present invention by heating the outer shell member by inductive heating to a predetermined temperature, and thereafter moving the ceramic inner member to a predetermined position relative to the outer shell member while the outer shell member is maintained at such predetermined temperature.

Due to the fact that the outer shell member is heated inductively, the outer shell member uniformly is heated over its entire surface area. Thereafter, the thus heated outer shell member does not have to be handled. Final positioning of the two members is achieved by insertion of the ceramic inner member into the outer shell member to the desired predetermined final position necessary to achieve the desired shape of the composite assembly. The inductor heater is maintained in operation during insertion of the inner member into the outer shell member, thereby insuring that the outer shell member is maintained at a predetermined minimum temperature. Particularly, there will not occur any so-called dark spots indicating advanced spot cooling of the outer shell member.

Thereafter, the outer shell member is cooled such that it shrinks onto the ceramic inner member. Cooling can be achieved by stopping operation of the inductive heater, and specifically the inductive heating source thereof. Cooling also can occur by subjecting the composite assembly to room temperature. Additionally of course, it would be possible to achieve or facilitate cooling by means of a coolant.

As indicated above, the outer shell member only may be inductively heated and expanded, and thereafter the inner member may be inserted into the thus heated and expanded outer shell member such that the inner member is moved to the predetermined final position thereof. Alternatively, the inner member may be joined to the outer shell member in a relatively preliminary position therebetween, after which both members are introduced into the inductive heater and inductively heated therein to cause the outer shell member to expand relative to the inner member. Upon such expansion, the inner member is moved from the preliminary position to the predetermined final position relative to the thus expanded outer shell member. Thereafter, the members are cooled whereby the outer shell member shrinks onto and around the inner member. This arrangement is particularly suitable when, for example, the outer shell member and the inner member are conically shaped or are frusto-conically shaped. Both members are inductively heated, but the outer shell member expands to a greater extent than the inner member, whereupon the inner member can be moved to the desired predetermined final position relative to the outer shell member.

In both embodiments or solutions of the process of the present invention, the outer shell member is uniformly heated, and the ceramic inner member is positioned in the desired predetermined final position relative to the outer shell member. The heated outer shell member need not be grasped or handled and transported to the inner member and positioned relative thereto. As a result, in accordance with the present invention, the outer shell member does not become prematurely cooled, not even in limited areas thereof.

In accordance with the present invention, the interior of the inductive heater preferably is shaped to the outer configuration of the outer shell member. As a result, there is only a small air gap surrounding the outer shell member. This reduces potential heat loss from the heated outer shell member and thereby results in efficient energy uses and requirements. This is enhanced by providing that the inductive heater is well thermally insulated, for example, by having the interior space thereof substantially sealed on all sides. This is relatively easy to achieve since the heated outer shell member need not be handled during heating thereof or during shrinkage thereof onto the outer surface of the ceramic inner member.

The outer shell member is formed of a metal material, for example steel, and thereby can be heated inductively without any other requirements.

The composite assembly of the present invention may take a number of various forms as would be understood by one skilled in this and related arts. For example, the ceramic inner member may be plate-shaped, and the outer shell member may be in the form of a band or strap shrunk onto the outer periphery of the plate-shaped member. Such a composite assembly is suitable, for example, as a movable plate assembly of a slide gate or slide enclosure unit for controlling the discharge of molten metal from a metallurgical vessel. Further, the ceramic inner member may be a gas flushing or purging stone or brick and may have a cylindrical, conical or frusto-conical configuration. The outer shell member may have a complementary configuration. The ceramic inner member may be of a porous refractory material or a refractory material having therethrough gas channels as would be understood by one skilled in the art.

In accordance with a further feature of the present invention, it is possible to position between the two members an intermediate layer of material that is stable at the predetermined temperature and that will deform between confronting surfaces of the two members upon shrinkage of the outer shell member onto the ceramic inner member. This is desirous to compensate for any existing undesirable roughness or high production tolerances of confronting surfaces of the two members. The intermediate layer may be positioned on the outer surface of the inner member or on the inner surface of the outer shell member prior to joining of the two members. The intermediate layer may partially or totally enclose the outer surface of the inner member. An additional advantage of such intermediate layer is that it can act as an elastic buffer between the two members. Thus, such layer can attenuate blows acting either on the outer shell member or on the ceramic inner member with respect to the other member. This particularly is advantageous if the composite assembly forms a soot particle filter or a catalyst member, for example in a motor vehicle.

In accordance with one arrangement of the present invention, the outer shell member is inserted into the interior of an inductor, i.e. inductive heater, attached to or operable by a frequency converter. The frequency converter is operated to heat the outer shell member to the predetermined temperature, particularly from 500° to 1000° C., preferably from 800° to 950° C. Thereby the outer shell member is expanded, and thereafter the inner member is inserted into the thus expanded outer shell member to the predetermined final position relative thereto. Operation of the frequency converter then is stopped and the composite assembly is removed from the inductor. Suitable inductors with frequency converters are commercially known and would be understood by one skilled in the art as being employable in carrying out the present invention. The cooling and shrinking of the outer shell member begins when the operation of the frequency converter is stopped. When the composite assembly is removed from the inductive heater, the outer shell member already is firmly fit onto the inner member. Cooling of the assembly to room temperature takes place outside the inductive heater.

In accordance with another preferred arrangement of the present invention, the outer shell member and the ceramic inner member are joined together in a relatively preliminary position outside the inductor. This composite arrangement then is inserted into the inductor, the frequency converter of the inductor then is operated to heat the outer shell member to from 500° to 1000° C., preferably from 800° to 950° C. This causes both members to expand, but the expansion of the ceramic inner member is negligible compared to the expansion of the outer steel shell member. The inner member then is moved relative to the outer shell member from the preliminary position to the predetermined final position and the frequency converter is stopped. The resultant composite assembly is removed from the inductor. Here also, following final positioning between the two members, the outer shell member will shrink onto the inner member after operation of the frequency converter is stopped.

It has been determined that the frequency converter may be a medium frequency converter with a rated power of from 12 to 30 kW, preferably substantially 25 kW, and a frequency of from 4 to 12 kHz, preferably from 7 to 10 kHz.

In accordance with a further preferred feature of the present invention, the outer shell member is inserted and firmly positioned within the inductive heater from below. The inductive heater is heat insulated and sealed on all sides, and this can be facilitated by a movable flap positioned to cover the bottom opening for insertion. The medium frequency converter then is operated until the desired predetermined temperature of the outer shell member has been reached. It has been determined from experience that this will occur generally at from 10 to 60 seconds, preferably perhaps from 20 to 30 seconds. The ceramic inner member then also is inserted from below into the outer shell member and is positioned relative thereto at the predetermined final position. Operation of the frequency converter is stopped after insertion of the inner member. Upon stopping of the frequency converter, the outer shell member immediately starts shrinking onto the inner member. The resultant composite assembly is removed downwardly from the inductor. The energy required for this operation is comparatively low since the interior of the inductive heater is sealed, and since the inductive heater is not operated until the outer shell member is inserted thereinto, and further since the operation of the inductive heater is switched off after insertion of the inner member into the outer shell member. This process can be carried out in a very simple manner since the two members can be inserted from the bottom and also can be removed from the bottom of the inductor.

In accordance with a further preferred arrangement of the present invention, it also is possible to insert the outer shell member and the ceramic inner member into the inductive heater from the top thereof and to remove the finished composite assembly from the inductor from the top thereof. Even further, it is to be understood that the operations of inserting the outer shell member first and thereafter the inner member, or alternatively inserting the two preliminarily joined members, as well as removal of the composite assembly may be achieved either from below or from above, or even conceivably laterally. Even further, it is to be understood that instead of fixedly positioning the inductive heater and moving the various members and assembly relative thereto, just the opposite could occur, i.e. the inductive heater could be moved relative to the members, and particularly relative to the composite assembly to result in the inductive heater being removed from such assembly.

BRIEF DESCRIPTION OF THE DRAWINGS

Other objects, features and advantages of the present invention will be apparent from the following detailed description of preferred embodiments thereof, with reference to the accompanying drawings, wherein.

DETAILED DESCRIPTION OF THE INVENTION

Figure 1:
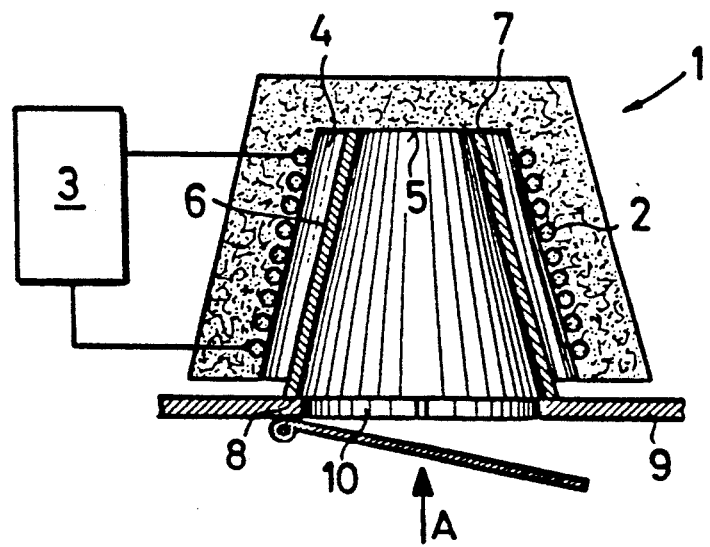
FIG. 1 is schematic sectional view illustrating an outer shell member positioned within an inductive heater in accordance with one embodiment of the present invention.

An inductor or inductive heater 1 includes a water-cooled coil 2 attached to a medium frequency converter 3 having a rated power output of approximately 25 kW and a working frequency ranging from 7 to 10 kHz. Inductor 1 has therein an inner chamber 4 approximately shaped to the configuration of a composite assembly to be formed therein. Chamber 4 is sealed on all sides and at its upper end 5. At the bottom thereof chamber 4 can be substantially sealed by means of a flap or the like. In accordance with an embodiment of the process of the invention illustrated in FIGS. 1-3, a frusto-conical outer shell member 6 formed of plate steel is inserted into chamber 4 from below in the direction of arrow A until an upper rim or edge 7 of member 6 abuts upper side or wall 5 of chamber 4. Outer shell member 6 is carried in direction A at its bottom rim 8 by means of a divided carrier 9 having therethrough a central opening 10. When outer shell member 6 is so positioned, the flap covering opening 10 is closed, and the chamber 4 is substantially sealed or closed and thermally insulated. Converter 3 is then operated so that coil 2 becomes live. The resultant alternating magnetic field of coil 2 causes outer shell member 6 to be heated up to a desired predetermined temperature, for example from 800° to 950° C. Such temperature is reached after approximately 20 to 30 seconds. By such heating, outer shell member 6 is expanded.

At this time, a frusto-conical gas flushing stone 11, formed of a suitable ceramic material as would be understood by one skilled in the art, is inserted upwardly through opening 10 in the direction of arrow A into the expanded outer shell member 6 until member 11 abuts snugly, for example when upper end 12 thereof contacts upper wall surface 5. This requires that the confronting adjacent surfaces of the two members that are to be joined initially are formed as accurately as possible in their cold state. Too high tolerances or variations in such dimensions or too much roughness of one or more of such surfaces is disadvantageous. This problem can be solved by machining or other suitable mechanical measures. Additionally however, in accordance with the present invention it is possible to compensate for such high tolerances or dimensional variations or for substantial roughness between the confronting surfaces of members 6 and 11. Thus, an intermediate layer (shown only schematically) may be positioned between such confronting surfaces before the members 6, 11 are joined together. As a result, when the member 6 shrinks onto member 11, the intermediate layer will deform in its wall thickness in accordance with the respective dimensional variations and/or local uneven portions of the confronting surfaces. Such intermediate layer need not totally enclose inner member 11 but can only partially so enclose member 11. The intermediate member may be initially applied to the inner surface of outer member 6 or to the outer surface of inner member 11. The intermediate layer can be formed as a mat or as a molded element. The intermediate layer can be made of a compressible fiber material or of a material that swells as a function of temperature, for example that swells when heated. In such case, the material of the intermediate layer may include ceramic fibers such as aluminum silicate, and swellable vermiculite.

Figure 2:
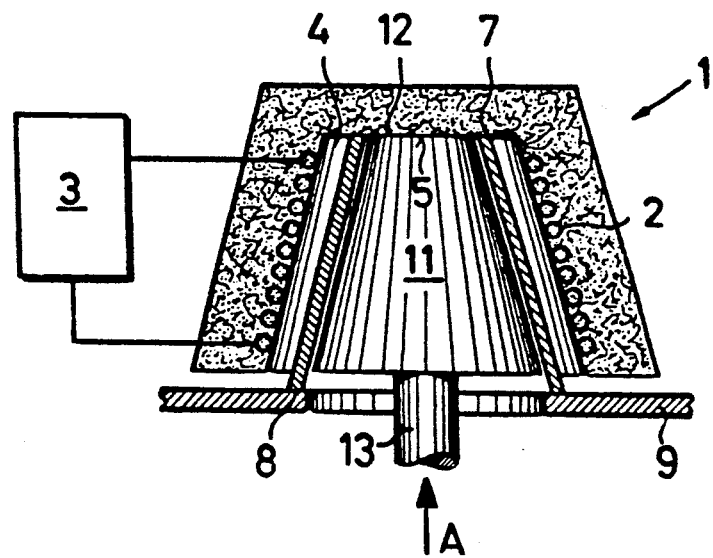
FIG. 2 is a similar schematic view illustrating a ceramic inner member to form a gas flushing stone positioned within the outer shell member.
Figure 3:
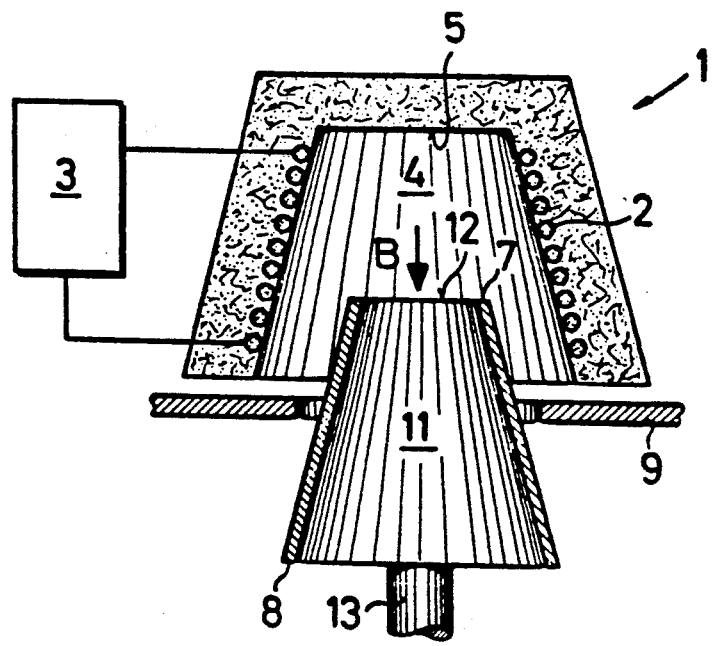
FIG. 3 is a similar schematic view illustrating a resultant composite assembly being removed from the inductive heater.

As shown in FIG. 2, gas flushing stone 11 is inserted into the expanded outer shell member by means of an elevating mechanism 13. As soon as gas flushing stone 11 is positioned in the desired predetermined final composite position, operation of converter 3 is stopped, and outer shell member 6 immediately starts to shrink onto gas flushing stone 11. Base or carrier 9 is opened, and the resultant composite assembly including outer shell member 6 shrunk onto gas flushing stone 11 is removed downwardly through the opened carrier 9 in the direction of arrow B (FIG. 3) by means of elevating mechanism 13. The composite assembly then will cool to room or ambient temperature.

Figure 4:
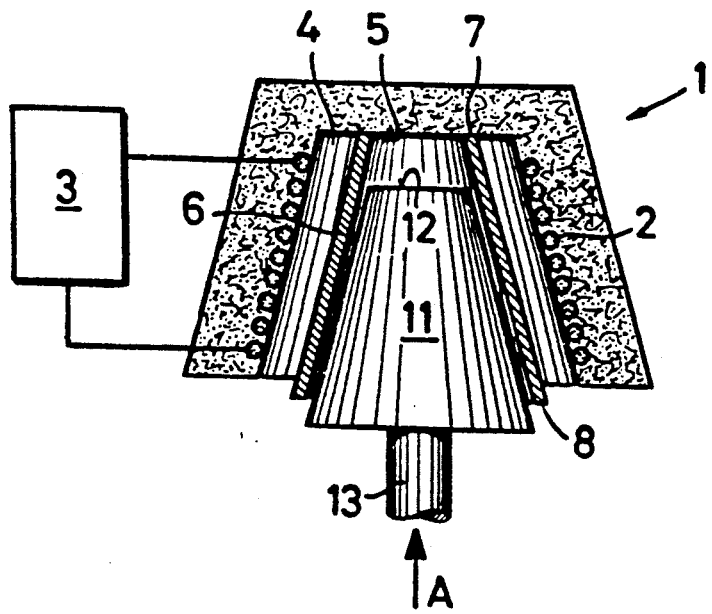
FIG. 4 is a similar schematic view illustrating a feature of another embodiment of the present invention.

In accordance with another embodiment of the present invention, illustrated generally in FIG. 4, the cold outer shell member 6 and gas flushing stone 11 initially are joined in a preliminary position outside of chamber 4 of the inductor. This can occur, for example, with gas flushing stone 11 being positioned on elevating mechanism 13 and then positioning the cold outer shell member 6 over the gas flushing stone 11. This also can be achieved however by pushing gas flushing stone 11 into outer shell member 6. Since outer shell member 6 has not yet been expanded, the desired predetermined final composite position of the two members is not achieved. Rather, a preliminary position illustrated in FIG. 4 is achieved. Subsequently, this composite arrangement is inserted into inner chamber 4 from below in the direction of arrow A by means of elevating mechanism 13 until upper rim 7 of outer shell member 6 makes contact with the upper side 5 of chamber 4. This position is shown in FIG. 4. Thereafter the medium frequency converter 3 is operated so that elements 6, 11 are heated. The expansion of element 6 will be much greater than that of element 11, such that it is possible to then move gas flushing stone 11 further in the direction of arrow A by elevating mechanism 13 until the upper face 12 of the gas flushing stone 11 is positioned in the desired predetermined final composite position, for example similar to the position shown in FIG. 2. Operation of converter 3 then is stopped whereupon the outer shell member shrinks onto the gas flushing stone 11. Elevating mechanism 13 then moves the resultant composite assembly downwardly outwardly of inner chamber 4.

It also would be possible to combine various of the above features of the two described embodiments. For example, it would be possible to position the cold outer shell member 6 within chamber 4 as shown in FIG. 1, then to move the cold gas flushing stone 11 to the preliminary position shown in FIG. 4, to then heat and expand outer shell member 6 and further insert the gas flushing stone 11 to the desired predetermined final composite position relative to member 6.

Although in the above arrangements the inductor 1 is sealed on all sides and at the top and is openable at the bottom, it would be possible in accordance with the present invention to provide the bottom sealed and to provide the top to be openable. Such an arrangement however would provide the potential disadvantage of greater heat losses when the top is open.

Even further, whereas the above specific embodiments of the present invention have been illustrated and described with regard to the manufacture of a gas flushing stone having an exterior metal jacket, it is possible to employ the present invention in making a great number of other composite assemblies including an inner ceramic member having shrunk thereabout an outer member in the form of a shell, jacket, strap or ring.

Although the present invention has been described and illustrated with respect to preferred embodiments thereof, it is to be understood that various changes and modifications may be made to the specifically described and illustrated arrangements without departing from the scope of the present invention.

We claim:

1. In a process of manufacturing a composite assembly including a ceramic inner member and a steel outer shell member fit around said inner member, wherein said outer shell member is heated and expanded, at least one of said members is moved relative to the other of said members such that said inner member is located at a predetermined position relative to said outer shell member, and said members are cooled such that said outer shell member shrinks onto said inner member, thereby forming a composite assembly, the improvement wherein:

said inner member is joined to said outer shell member in a relatively preliminary position;

thereafter said members are subjected to inductive heating to cause said outer shell member to be heated to a predetermined temperature and to be expanded relative to said inner member;

thereafter said inner member is moved relative to said outer shell member from said preliminary position until said inner member is located at said predetermined position relative to said thus expanded outer shell member; and said outer shell member is maintained at said predetermined temperature and expanded during movement of said inner member by continuing and maintaining said inductive heating until said inner member is located at said predetermined position relative to said outer shell member.

2. The improvement claimed in claim 1, wherein said inner member is plate-shaped, and said outer shell member comprises a band shrunk onto the periphery of said plate-shaped member.

3. The improvement claimed in claim 1, wherein respective outer and inner surfaces of said inner member and said outer shell member are cylindrical.

4. The improvement claimed in claim 1, wherein respective outer and inner surfaces of said inner member and said outer shell member are conical.

5. The improvement claimed in claim 1, wherein respective outer and inner surfaces of said inner member and said outer shell member are frusto-conical.

6. The improvement claimed in claim 1, further comprising positioning between said members an intermediate layer of a material that is stable at said predetermined temperature and that will deform between confronting surfaces of said members, thereby accommodating any roughness or production tolerances of said surfaces.

7. The improvement claimed in claim 6, comprising positioning said layer on the outer surface of said inner member prior to joining of said members.

8. The improvement claimed in claim 6, comprising positioning said layer on the inner surface of said outer shell member prior to joining of said members.

9. The improvement claimed in claim 6, wherein said layer partially encloses the outer surface of said inner member.

10. The improvement claimed in claim 6, wherein said layer totally encloses the outer surface of said inner member.

11. The improvement claimed in claim 6, wherein said material of said layer is compressible.

12. The improvement claimed in claim 6, wherein said layer is in the form of a mat or is a molded member.

13. The improvement claimed in claim 6, wherein said material of said layer swells as a function of temperature.

14. The improvement claimed in claim 13, wherein said material of said layer comprises ceramic fibers and swellable vermiculite.

15. The improvement claimed in claim 14, wherein said ceramic fibers comprise aluminum silicate fibers.

16. The improvement claimed in claim 1, wherein said inner member comprises a gas flushing stone.

17. The improvement claimed in claim 1, wherein said inner member comprises a refractory member for use in discharging molten metal from a metallurgical vessel.

18. The improvement claimed in claim 1, wherein said inner member comprises a particle filter or a catalyst element.

19. In a process of manufacturing a composite assembly including a ceramic inner member and a steel outer shell member fit around said inner member, wherein said outer shell member is heated and expanded, at least one of said members is moved relative to the other of said members such that said inner member is located at a predetermined position relative to said outer shell member, and said members are cooled such that said outer shell member shrinks onto said inner member, thereby forming a composite assembly, the improvement wherein:

said inner member is joined to said outer shell member in a relatively preliminary position;

the thus preliminarily positioned members are inserted into an inductive heater operable by a frequency converter and said frequency converter is operated to subject said members to inductive heating to a predetermined temperature and thereby to expand said outer shell member relative to said inner member;

thereafter said inner member is moved from said preliminary position to said predetermined position relative to the thus expanded outer shell member;

said outer shell member is maintained at said predetermined temperature and expanded during movement of said inner member by continuing and maintaining said inductive heating until said inner member is located at said predetermined position relative to said outer shell member;

then operation of said frequency converter is stopped such that said outer shell member shrinks onto said inner member to form said composite assembly; and said composite assembly of said inner member and said outer shell member is removed from said inductive heater.

20. The improvement claimed in claim 19, wherein said outer shell member and said inner member are introduced into said inductive heater from below, and said composite assembly is removed from said inductive heater from below.

21. The improvement claimed in claim 19, wherein said inductive heater is thermally insulated and is substantially sealed from all sides.

22. The improvement claimed in claim 19, wherein said outer shell member and said inner member are introduced into said inductive heater from above, and said composite assembly is removed from said inductive heater from above.

23. The improvement claimed in claim 19, wherein said predetermined temperature is from 500° to 1000° C.

24. The improvement claimed in claim 23, wherein said predetermined temperature is from 800° to 950° C.

25. The improvement claimed in claim 19, wherein said frequency converter is a medium frequency converter with a rated power of from 12 to 30 kW and a frequency of from 4 to 12 kHz.

26. The improvement claimed in claim 25, wherein said rated power is approximately 25 kW and said frequency is from 7 to 10 kHz.

27. The improvement claimed in claim 19, wherein said outer shell member is heated within said inductive heater for a time period of from 10 to 60 seconds before said inner member is moved to said predetermined position.

28. The improvement claimed in claim 27, wherein said time period is from 20 to 30 seconds.

29. The improvement claimed in claim 19, wherein said inner member is plate-shaped, and said outer shell member comprises a band shrunk onto the periphery of said plate-shaped member.

30. The improvement claimed in claim 19, wherein respective outer and inner surfaces of said inner member and said outer shell member are cylindrical.

31. The improvement claimed in claim 19, wherein respective outer and inner surfaces of said inner member and said outer shell member are conical.

32. The improvement claimed in claim 19, wherein respective outer and inner surfaces of said inner member and said outer shell member are frusto-conical.

33. The improvement claimed in claim 19, further comprising positioning between said members an intermediate layer of a material that is stable at said predetermined temperature and that will deform between confronting surfaces of said members, thereby accommodating any roughness or production tolerances of said surfaces.

34. The improvement claimed in claim 33, comprising positioning said layer on the outer surface of said inner member prior to joining of said members.

35. The improvement claimed in claim 33, comprising positioning said layer on the inner surface of said outer shell member prior to joining of said members.

36. The improvement claimed in claim 33, wherein said layer partially encloses the outer surface of said inner member.

37. The improvement claimed in claim 33, wherein said layer totally encloses the outer surface of said inner member.

38. The improvement claimed in claim 33, wherein said material of said layer is compressible.

39. The improvement claimed in claim 33, wherein said layer is in the form of a mat or is a molded member.

40. The improvement claimed in claim 33, wherein said material of said layer swells as a function of temperature.

41. The improvement claimed in claim 40, wherein said material of said layer comprises ceramic fibers and swellable vermiculite.

42. The improvement claimed in claim 41, wherein said ceramic fibers comprise aluminum silicate fibers.

43. The improvement claimed in claim 19, wherein said inner member comprises a gas flushing stone.

44. The improvement claimed in claim 19, wherein said inner member comprises a refractory member for use in discharging molten metal from a metallurgical vessel.

45. The improvement claimed in claim 19, wherein said inner member comprises a particle filter or a catalyst element.

* * * * *